Aug. 14, 1934.   A. J. MEYER   1,969,814
INTERNAL COMBUSTION ENGINE
Original Filed Dec. 22, 1926   4 Sheets-Sheet 1
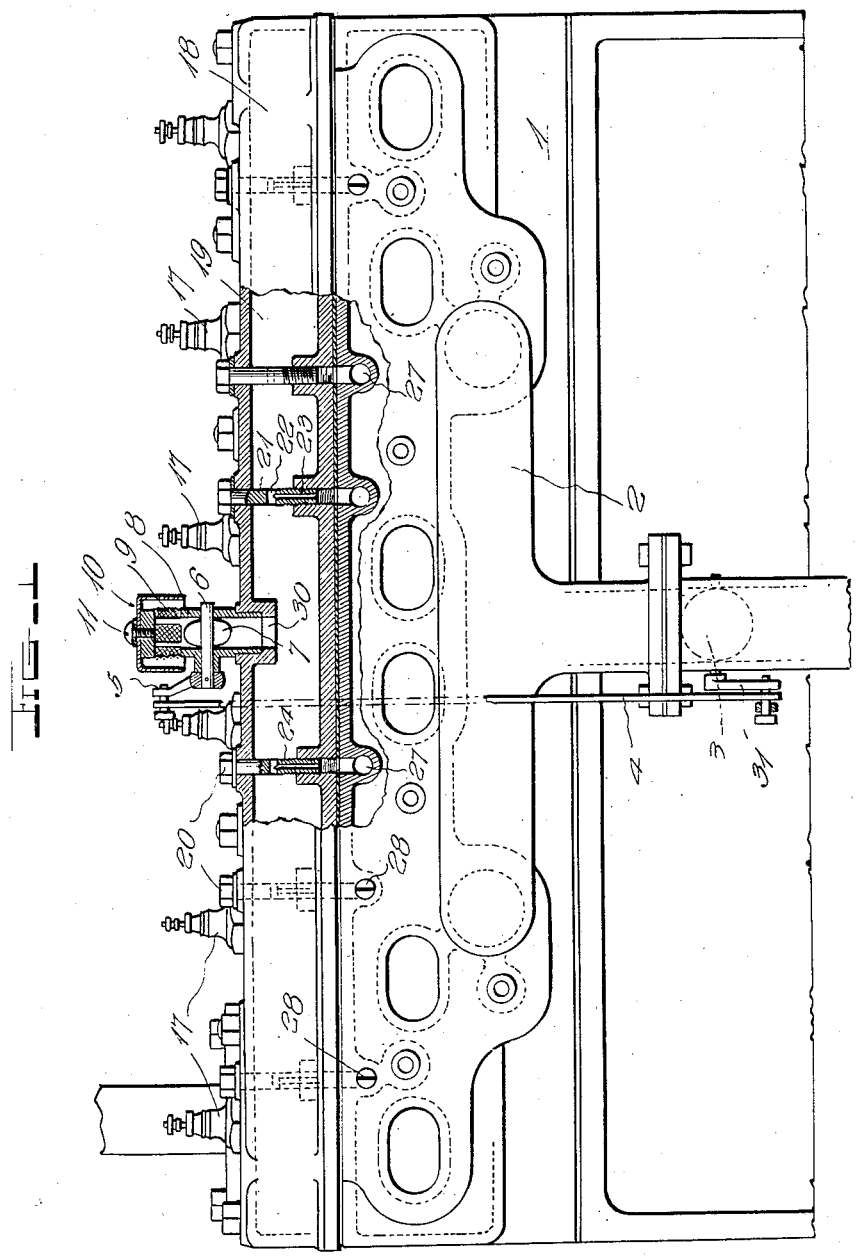
INVENTOR:
A. J. Meyer,
BY John O. Brady
ATTORNEY.

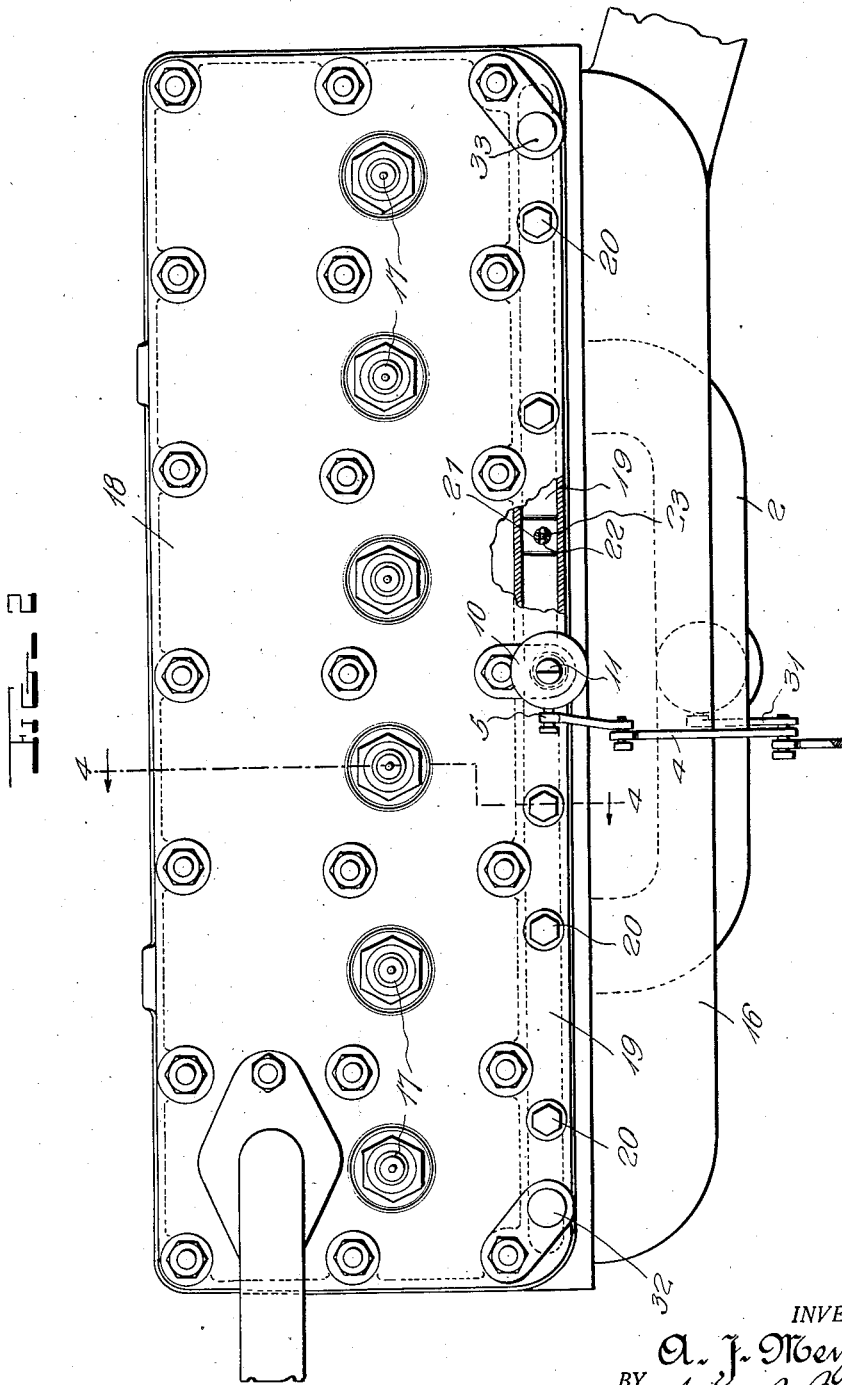

Aug. 14, 1934. A. J. MEYER 1,969,814
INTERNAL COMBUSTION ENGINE
Original Filed Dec. 22, 1926   4 Sheets-Sheet 3
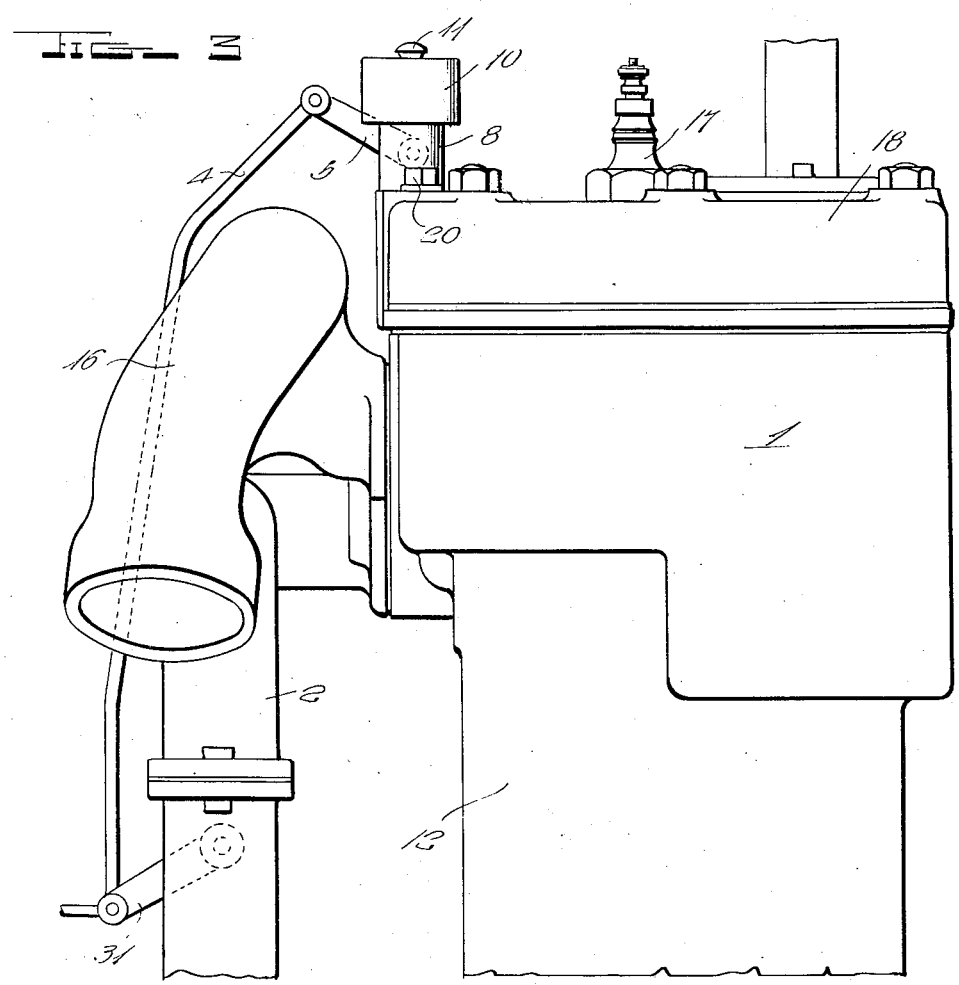
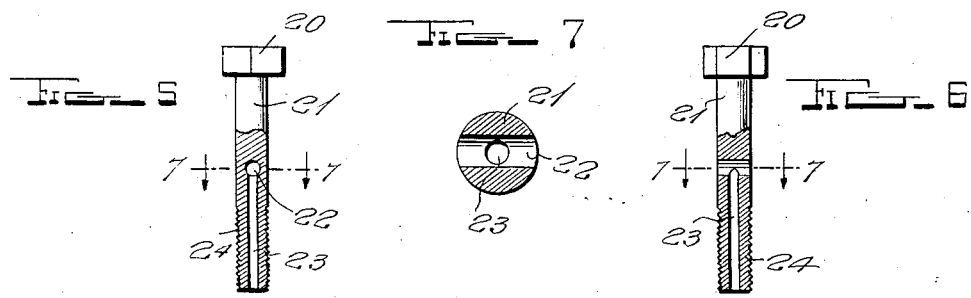
INVENTOR.
A. J. Meyer,
BY John B. Brady
ATTORNEY.

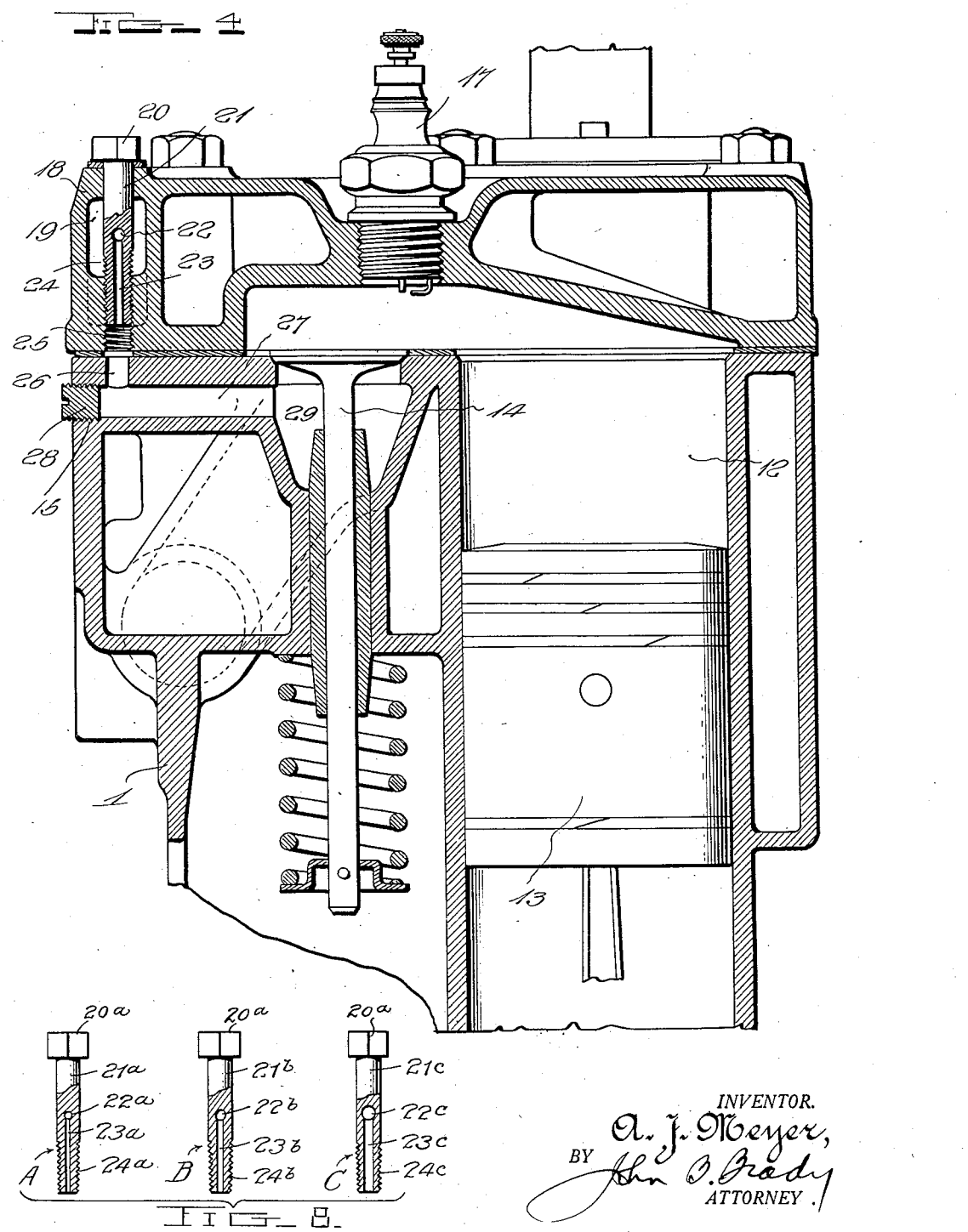

Patented Aug. 14, 1934

1,969,814

UNITED STATES PATENT OFFICE 1,969,814

INTERNAL COMBUSTION ENGINE

André J. Meyer, Detroit, Mich., assignor to Continental Motors Corporation, Detroit, Mich., a corporation of Virginia Application December 22, 1926, Serial No. 156,400
Renewed September 8, 1930

10 Claims. (Cl. 123—52)

My invention relates broadly to internal combustion engines and more particularly to a construction of internal combustion engine in which the thermal efficiency is substantially increased over that obtainable in internal combustion engines heretofore designed.

One of the objects of my invention is to provide a construction of internal combustion engine wherein a uniform explosive mixture may be supplied to each of the cylinders of an internal combustion engine for increasing the over all efficiency of the engine.

Another object of my invention is to provide means for supplying air in proportion to the operation of the carbureter to each of the cylinders of an internal combustion engine with means for controlling the pressure and volume of the air thus supplied for rendering the explosive composition uniform in each of the engine cylinders.

Another object of my invention is to provide a construction of valve system for independently supplying air to each of the cylinders of an internal combustion engine with means for controlling the pressure of the air thus supplied in accordance with the operation of the throttle valve of the carbureter.

Still another object of my invention is to provide a construction of nozzle valve for admitting air in predetermined quantity immediately adjacent the intake valve for each cylinder of an internal combustion engine with means for regulating the pressure of air which is supplied to the several nozzles for uniformly regulating the combustible mixture in the several cylinders.

My invention will be more clearly understood by reference to the following specification and the accompanying drawings in which:

Figure 1 is a side elevation of an internal combustion engine embodying the principles of my invention with parts thereof broken away to show the interior arrangement of the nozzles and ports by which air is independently supplied in predetermined quantity to each of the cylinders of the engine; Fig. 2 is a top plan view of an internal combustion engine showing the embodiment of my invention therein with parts broken away to more clearly illustrate the nozzle arrangement in the air supply manifold; Fig. 3 is an end elevation of an internal combustion engine constructed in accordance with my invention; Fig. 4 is a cross-sectional view taken through one of the cylinders of the engine and illustrating the arrangement of air supply nozzles in accordance with my invention; Figs. 5, 6 and 7 show the construction of the air regulating nozzle employed in the air manifold of the internal combustion engine, and Fig. 8 illustrates a set of nozzles of differing sizes which may be used in the air manifold.

The thermal efficiency and power output of single cylinder engines are normally greater than that of multi-cylinder motors when the efficiency of each of the cylinders is individually considered. The principal reason for this resides in the fact that it is extremely difficult to provide an explosive mixture of equal composition for all cylinders. Due to the non-gaseous condition of the fuel the fluid particles have the tendency to be thrown to the outside of the curved paths in the bends of the manifold. On account of this some cylinders will obtain a lean and others a rich charge.

A mixture which contains the exact amount of fuel that can be burned completely by the amount of air present will be termed as having 100% mixture strength. No mixture can be ignited unless its strength lies in between 85 and 150%. In modern engines the carbureter must be adjusted in such manner that the leanest cylinder will receive a charge of at least 85% mixture strength.

When this adjustment is obtained it will be found that at least at low engine speeds when the fuel is insufficiently atomized, some other cylinders will receive a charge of 150% or more so that missing and drop in power will occur.

To correct this condition it has been proposed to heat the fuel to such an extent that a large percentage becomes evaporated thus diminishing distribution troubles. However, this heating process decreases the volumetric efficiency considerably with the result of low power output. Further, it has been found that a mixture strength of 85% gives the best thermal efficiency in single cylinder engines.

In selecting some intermediate running condition it will therefore be obvious that both efficiency and power output are sacrificed in any multi-cylinder internal combustion engine.

In investigating the performance of internal combustion engines under different conditions of load it has been found that under no load conditions the highest vacuum in pounds per square inch is created in the intake manifold and as the load increases the vacuum in the intake manifold decreases. Under conditions of no load or light load while a high vacuum is created there is only a small amount of combustible mixture passing through the valves and the quantity of combustible mixture must be increased as the load increased.

My invention contemplates the individual regulation of the mixture strength per cylinder by means of a quantity of air which is introduced immediately under the intake valve of each cylinder, the quantity of air admitted being metered by a nozzle while the pressure of the air entering the nozzle is regulated by means of a throttle valve. I employ a throttle valve for regulating the pressure of air supplied to independent nozzles which govern the volume of air admitted to each cylinder. The pressure regulating means is controlled simultaneously with the movement of the throttle valve of the carbureter. Without the pressure regulating means in the internal combustion engine arrangement of my invention there would be a maximum quantity of air admitted by the nozzles at minimum loads and a minimum quantity of air admitted under conditions of maximum load. This would result in a very lean mixture when the engine is running idle and a very rich mixture when the engine is fully loaded which would render the internal combustion engine unsuitable for automotive purposes.

Referring to the drawings in more detail reference character 1 designates the internal combustion engine provided with a plurality of cylinders 12 in which pistons 13 are arranged to reciprocate. The intake manifold is represented at 2 having a carbureter throttle valve 3 therein whose position is controlled by link 4 actuating crank arm 31. The link 4 is pivotally connected to crank arm 5 which is arranged to rotatably move shaft member 6 for controlling the position of butterfly valve 7 in the valve housing 8 which is screw threaded into an aperture 30 in the cylinder head 18. An air manifold 19 extends longitudinally of the cylinder head 18 and is open to the atmosphere through the port 30 and valve housing 8. A screen 9 closes the upper extremity of the valve housing 8 and a dust cap 10 is secured by means of a screw 11 over the top of the valve housing. My invention has been illustrated in connection with a six cylinder engine having the exhaust manifold 16 and the intake manifold 2. Spark plugs 17 are shown for each of the cylinders. The air manifold 19 which extends adjacent one side of the cylinder head 18 is sealed at the ends provided for the core supports in the process of casting by means of plugs 32 and 33. The air manifold is thus closed at each end and supplied with air through port 30 under control of valve 7 at substantially the center thereof. Immediately beneath the intake valve 14 of each of the cylinders and terminating in the space 29 under the head of the poppet valve I provide a port 27 which is drilled through the engine structure 1. The outer end of this port 27 is screw threaded at 15 to receive a plug 28. A port 26 is arranged in the engine structure 1 substantially at an angle with the port 27 and is aligned with a screw threaded port 25 in the cylinder head 18. The nozzle which regulates the quantity of air admitted to each cylinder is shown at 20 as including a body structure 21 having a laterally extending port 22 therethrough and a longitudinally extending port 23 passing from the end of the body structure 21 and connecting with the laterally extending port 22. The body structure of the nozzle is screw threaded at 24 so that it may be screwed fast in the threads 25 of cylinder head 18. The size of this nozzle will vary for the different cylinders and must be such that all of the cylinders obtain a charge of substantially the same mixture strength. Air is admitted from the air manifold 19 to the port 22 and then through the longitudinally extending port 23 to screw threaded port 25, port 26, laterally extending port 27, area 29 immediately below the intake valve 14, and then to cylinder 12. A set of nozzles of differing sizes has been illustrated in Fig. 8 at A, B, C with the corresponding parts thereof represented by reference characters similar to the reference characters in Figs. 5, 6 and 7 with subscripts $a$, $b$ and $c$ at $20a$, $20b$ and $20c$, etc. It is necessary to regulate the pressure of the air entering the several nozzles dependent upon the engine speed and load. This is accomplished by the linking of valve 7 with throttle valve 3 in such manner that the pressure of the air entering each of the metering valves 20 is proportioned to the combustible charge supplied to the cylinders.

The metering nozzles 20 are readily interchangeable for introducing different quantities of air into each of the cylinders as observation under running conditions may determine. The parts required in carrying out the principles of my invention are extremely simple in construction and inexpensive in manufacture and production.

While I have illustrated the air manifold as cast integral with the cylinder head, I desire that it be understood that the manifold might be exterior of the cylinder head and connections established with each of the metering nozzles. The ports in the casting adjacent the engine cylinders may be directed at any desired angle and it is not necessary that they extend perpendicular of the axes of the cylinders as has been represented in the drawings.

I desire that it be understood that other modifications of this invention may be made as will readily suggest themselves to those skilled in the art and that no limitations upon my invention are intended other than are imposed by the scope of the appended claims.

What I claim as new and desire to secure by Letters Patent of the United States is as follows:

1. In a multiple cylinder internal combustion engine, a plurality of cylinders, an independent intake valve for each cylinder, a ported bolt individual to each cylinder for individually supplying a predetermined quantity of air at the intake valves of each of said cylinders and means for controlling pressure of air supplied to each of said ported bolts at a central point with respect to said ported bolts.

2. In a multiple cylinder internal combustion engine having a plurality of cylinders, independent fuel intake valve means for each cylinder, a source of air supply, and individual nozzle fixtures removably associated with each cylinder and disposed intermediate the source of air supply and the fuel stream, said nozzle fixtures provided with fixed air openings of selective size for introducing a metered charge of air into the fuel stream adjacent the intake valve means.

3. In a multiple cylinder internal combustion engine having a plurality of cylinders, independent fuel intake valve means for each cylinder, a source of air supply, individual means including a metering device associated with each cylinder for introducing a metered charge of air into the fuel stream adjacent the intake means, said metering device operable independently of the engine suction, and a mechanically controlled device for controlling at least in part the pressure of the said source of air supply.

4. In a multiple cylinder internal combustion engine having a plurality of cylinders, independent fuel intake valve means for each cylinder, a source of air supply, individual nozzle fixtures having ports of fixed dimensions associated with each cylinder and disposed intermediate the source of air supply and the fuel stream for introducing a predetermined metered charge of air into the fuel stream adjacent the intake valve means, and means controlling the pressure of the said source of air supply.

5. In a multiple cylinder internal combustion engine having six or more cylinders, independent fuel intake valve means for each cylinder, means for controlling the supply of combustible mixture to each of said intake valves, a source of air supply, means controlled simultaneously with the control of the supply of combustible mixture to said intake valves for varying the pressure of the air in said source of air supply, and individual means associated with each cylinder and including a metering device operable independently of the engine suction for metering the flow of air from said source of air supply to the combustible mixture adjacent each intake valve means.

6. An internal combustion engine comprising a frame, a plurality of cylinders carried by said frame, an intake valve for each of said cylinders, an air port in said frame individual to each of said intake valves, a manifold common to all of said air ports, a valve for controlling the pressure of air admitted to said manifold and a nozzle member individual to each of said air ports for independently regulating the values of air supplied through a jet to said individual cylinder, said air supply being regulated by engine suction and a mechanically actuated control means.

7. An internal combustion engine comprising a frame, a plurality of cylinders carried by said frame, an intake valve for each of said cylinders, an air port in said frame individual to each of said intake valves, a manifold common to all of said air ports, means for controlling the supply of combustible mixture to said intake valves and means controlled by said first mentioned means for regulating the pressure of air supplied to said manifold, and individual jets interposed between each of said air ports and said manifold for independently regulating the values of air admitted to the corresponding one of said cylinders, said air supply being regulated by engine suction and a mechanically actuated control device.

8. An internal combustion engine comprising a frame, a plurality of cylinders carried by said frame, an intake valve for each of said cylinders, means for controlling the supply of combustible mixture to each of said intake valves, an air port in said frame individual to each of said intake valves, an air manifold common to all of said air ports, screw threaded nozzle members of selected size for individually controlling the quantity of air transferred from said air manifold to each of said air ports and nozzles, the supply of air being mechanically controlled simultaneously with the control of the supply of combustible mixture to said intake valves for varying the pressure of air admitted to said manifold whereby a uniform combustible mixture may be supplied to said cylinders under varying conditions of load.

9. An internal combustion engine comprising a plurality of cylinders, a header for said cylinders, an air manifold positioned in said header, an intake valve for each of said cylinders, an air port in said manifold individual to each of said intake valves, metering nozzles disposed between said air manifold and each of said air ports and means for controlling the pressure of air supplied to said air manifold for distribution in predetermined quantities to each of said cylinders, said means being controlled in response to engine suction and by a mechanically actuated control device.

10. An internal combustion engine, a frame, a plurality of cylinders carried by said frame, a header for said cylinders, an intake valve for each of said cylinders, air ports in said frame individual to each of said intake valves, an air manifold extending longitudinally of said header adjacent one side thereof, metering nozzles extending through said header and into ports for supplying air in predetermined quantity to each of said cylinders and valve mechanism mounted centrally of said header for controlling the pressure of air admitted to said air manifold for regulating the combustible charge admitted to said cylinders under varying conditions of load, said valve mechanism effecting a supplemental regulation of the air pressure in said air manifold.

ANDRÉ J. MEYER.